(12) United States Patent
Hasegawa et al.

(10) Patent No.: US 10,498,907 B2
(45) Date of Patent: Dec. 3, 2019

(54) MEDIUM STORING PROGRAM, IMAGE PROCESSING APPARATUS, AND IMAGE PROCESSING METHOD

(71) Applicant: BROTHER KOGYO KABUSHIKI KAISHA, Nagoya-shi, Aichi-ken (JP)

(72) Inventors: Tomohiko Hasegawa, Okazaki (JP); Akidi Yoshida, Nagoya (JP); Ryohei Ozawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/854,344

(22) Filed: Dec. 26, 2017

(65) Prior Publication Data
US 2018/0220010 A1    Aug. 2, 2018

(30) Foreign Application Priority Data

Jan. 31, 2017    (JP) ................. 2017-015261

(51) Int. Cl.
*H04N 1/00*    (2006.01)
*H04N 1/21*    (2006.01)

(52) U.S. Cl.
CPC ..... *H04N 1/00045* (2013.01); *H04N 1/00334* (2013.01); *H04N 1/21* (2013.01); *H04N 2201/0006* (2013.01); *H04N 2201/3276* (2013.01)

(58) Field of Classification Search
CPC .............. G06K 9/00228; G06T 3/0093; G06T 2207/10016; G06T 2207/30196; G06T 2207/30221; G06T 2207/30241; G06T 7/246; H04N 5/232; H04N 5/23219; H04N 1/00045; H04N 1/00334; H04N 1/21; H04N 2201/0006; H04N 2201/3276
USPC ................................................. 358/474, 482
See application file for complete search history.

(56) References Cited

U.S. PATENT DOCUMENTS

| | | | | |
|---|---|---|---|---|
| 6,341,071 | B1 * | 1/2002 | Johnson | ............ H01L 23/49816 174/255 |
| 2005/0286793 | A1 * | 12/2005 | Izumi | ....................... H04N 1/58 382/263 |
| 2009/0059030 | A1 * | 3/2009 | Hoshii | ................... H04N 5/232 348/222.1 |

(Continued)

FOREIGN PATENT DOCUMENTS

JP    2006279236 A    10/2006

*Primary Examiner* — Negussie Worku
(74) *Attorney, Agent, or Firm* — Scully Scott Murphy & Presser, P.C.

(57) ABSTRACT

A medium stores a program. The program causes a computer to: acquire relative area information which at least indicates a relative position of a reference area relative to a reference document and a relative size of the reference area relative to a size of the reference document; acquire target image data which indicates a target image including a document; identify a target area in the target image by use of the target image data, the target area being in the relative position, which is indicated by the relative area information, relative to the target image, the target area having the relative size, which is indicated by the relative area information, relative to the size of the target image; analyze an area, in the target image, including the target area; and output image data based on the target image data.

20 Claims, 11 Drawing Sheets

(56) References Cited

U.S. PATENT DOCUMENTS

| | | | |
|---|---|---|---|
| 2014/0092408 A1* | 4/2014 | Hasegawa | H04N 1/40062 358/1.9 |
| 2015/0254801 A1* | 9/2015 | Hasegawa | G06K 9/342 345/660 |
| 2015/0278661 A1* | 10/2015 | Hasegawa | H04N 1/00 358/1.9 |
| 2016/0292503 A1* | 10/2016 | Motoyama | G06T 7/73 |
| 2016/0292531 A1* | 10/2016 | Motoyama | G06K 9/4604 |
| 2016/0292532 A1* | 10/2016 | Yoshida | G06K 9/4604 |
| 2016/0370239 A1* | 12/2016 | Cummings | G01L 5/0052 |

* cited by examiner

RELATIVE AREA INFORMATION AIa

Pra(Xra,Yra)={(X2a/W1),(Y2a/H1)}
Wra=(W2a/W1)
Hra=(H2a/H1)

RELATIVE AREA INFORMATION AIb

Prb(Xrb,Yrb)={(X2b/W1),(Y2b/H1)}
Wrb=(W2b/W1)
Hrb=(H2b/H1)

RELATIVE AREA INFORMATION AIc

Prc(Xrc,Yrc)={(X2c/W1),(Y2c/H1)}
Wrc=(W2c/W1)
Hrc=(H2c/H1)

Fig. 6A
TARGET IMAGE FILE
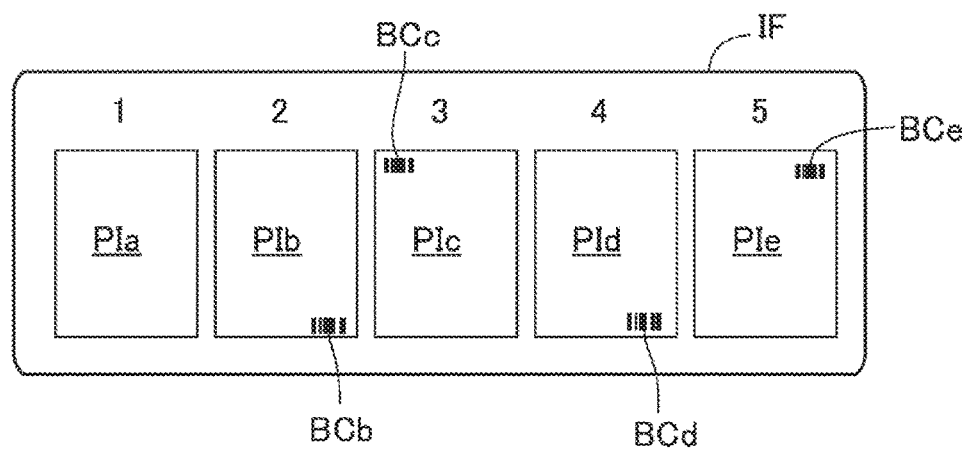
Fig. 6B
OUTPUT IMAGE FILE
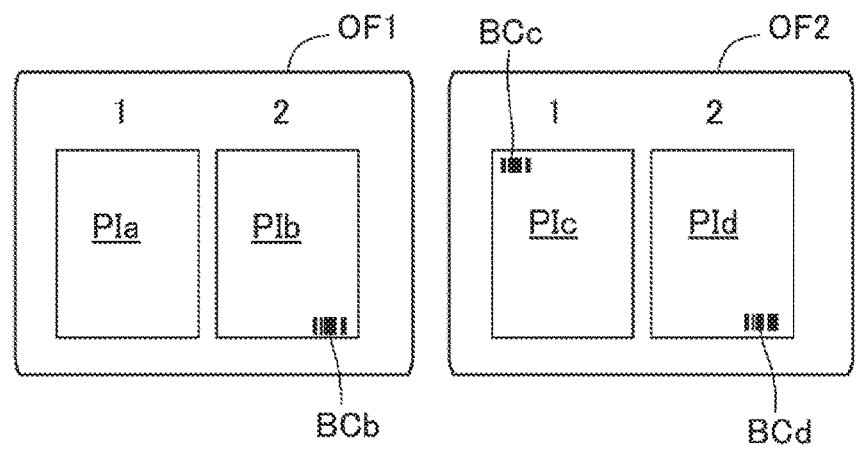
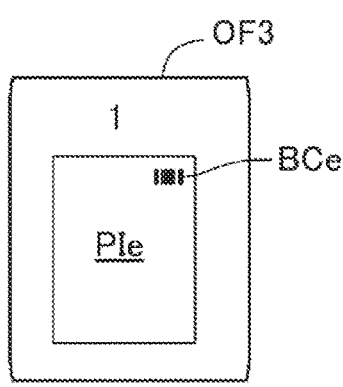

COMPARATIVE EXAMPLE

TARGET AREA TO BE IDENTIFIED

Pqz(Xqz,Yqz)=(X2a,Y2a)
Wqz=W2a
Hqz=H2a

TARGET AREA TO BE IDENTIFIED

Ptz(Xtz,Ytz)=(X2a,Y2a)
Wtz=W2a
Htz=H2a

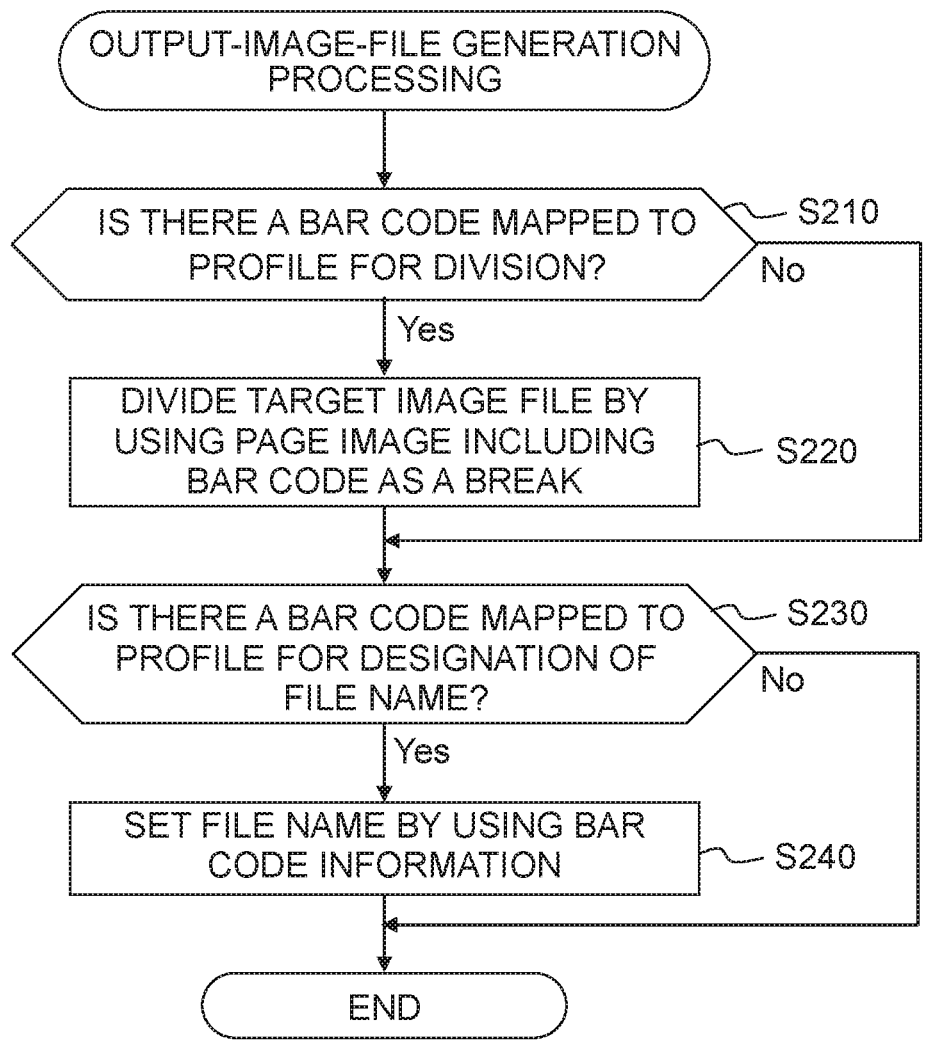

MEDIUM STORING PROGRAM, IMAGE PROCESSING APPARATUS, AND IMAGE PROCESSING METHOD

CROSS REFERENCE TO RELATED APPLICATION

The present application claims priority from Japanese Patent Application No. 2017-015261 filed on Jan. 31, 2017, the disclosure of which is incorporated herein by reference in its entirety.

TECHNICAL FIELD

The present application relates to image processing for target image data that is generated by using an image sensor.

BACKGROUND

A multifunction peripheral disclosed in Japanese Patent Application Laid-open No. 2006-279236 analyzes scan data that is acquired by reading a ground tint document in which ground tint information is embedded, and searches a key cord such as a bar code. When the key cord is in the document, the multifunction peripheral uses information of the key cord to perform ground tint printing that can securely prevent an illegal copy.

SUMMARY

In the above technology, however, the analysis can not be appropriately performed depending on, for example, the size of the target image data (e.g., scan data). This may make it hard to perform output appropriately.

An object of the present teaching is to provide technology of appropriately analyzing target image data and appropriately executing output processing depending on the target image data.

According to an aspect of the present teaching, there is provided a non-transitory computer-readable medium storing a program executable by a computer that, when executed by a processor of the computer, causes the computer to execute: first acquisition processing of acquiring at least one piece of relative area information which at least indicates a relative position of at least one reference area relative to a reference document and a relative size of the at least one reference area relative to a size of the reference document; second acquisition processing of acquiring target image data which is generated by using an image sensor and indicates a target image including a document; identification processing of identifying at least one target area in the target image by use of the target image data, the at least one target area being in the relative position, which is indicated by the at least one piece of relative area information, relative to the target image, the at least one target area having the relative size, which is indicated by the at least one piece of relative area information, relative to the size of the target image; analysis processing of analyzing an area, in the target image, including the at least one target area; and output processing of outputting output image data based on the target image data, the output processing being different depending on an analysis result of the at least one target area.

According to the above aspect, the at least one target area is identified based on the size of the target image and the relative area information, and the output processing is executed depending on the analysis result of the at least one target area. This results in appropriate analysis of the target image data. For example, the target image data is appropriately analyzed irrespective of the resolution of the target image data at the time of generation and the size of the target image data. Thus, the appropriate output processing can be executed depending on the target image data.

The technology disclosed in the present specification can be achieved in a variety of aspects. For example, the technology can be achieved in aspects including a printing apparatus, a printing method, an image processing method, a computer program for achieving the function of the apparatus or such methods, and a storage medium storing the computer program, and the like.

BRIEF DESCRIPTION OF THE DRAWINGS

FIG. 6A depicts an example of a target image file and FIG. 6B depicts an example of an output image file.

FIG. 9 is a flowchart of output-image-file generation processing.

DESCRIPTION OF THE EMBODIMENTS

<System Configuration>

Figure 1:
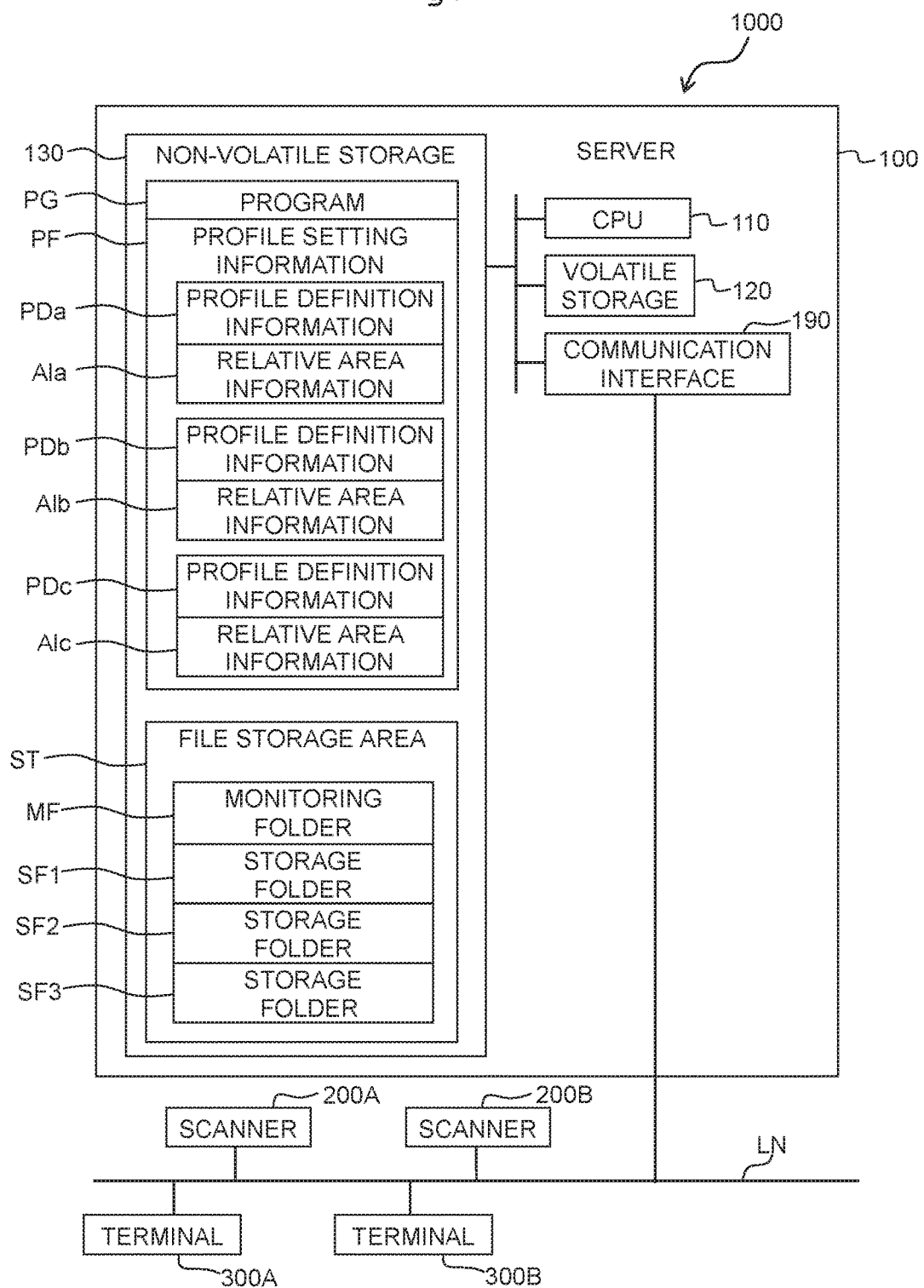
FIG. 1 is an illustrative view of an image processing system according to an embodiment of the present teaching.

As depicted in FIG. 1, an image processing system 1000 includes a server 100, scanners 200A and 200B, and terminals 300A and 300B. The sever 100, the scanners 200A and 200B, and the terminals 300A and 300B are connected to a local area network LN. This allows the sever 100, the scanners 200A and 200B, and the terminals 300A and 300B to communicate with each other via the local area network LN.

The server 100 is, for example, a local storage server that is managed by an administrator of the local area network LN to provide a storage area for the scanners 200A and 200B and the terminals 300A and 300B as clients. In this embodiment, the server 100 includes a CPU 110, a volatile storage 120 and a non-volatile storage 130 as internal memories, and a communication interface 190. Those are connected to each other via a bus.

The CPU 110 is an arithmetic device (processor) as a controller of the server 100. The volatile storage 120, which may be a DRAM, provides a buffer area in which a variety of intermediate data generated when the CPU 110 performs processing are stored temporarily. The non-volatile storage 130 is, for example, a hard disk drive. The non-volatile storage 130 stores a computer program PG and profile setting information PF. The non-volatile storage 130 further includes a file storage area ST that is a storage area for each client. The profile setting information PF includes one or more pieces of profile definition information PD. The profile definition information PD is information defining a profile for bar-code use processing described below, specifically, information defining a format of a file to be processed and a bar-code use method. Each piece of profile definition information PD is mapped to relative area information AI described below. In FIG. 1, the profile setting information PF includes three pieces of profile definition information PDa to PDc and three pieces of relative area information AIa to AIc that are mapped to the three pieces of profile definition information PDa to PDc, respectively. The file storage area ST includes, as sub areas, a monitoring folder MF and storage folders SF1 to SF3.

The CPU 110 executes the computer program PG to provide a scan-data processing service that includes a profile setting function and a function of executing the bar-code use processing described below. The computer program PG is provided, for example, by a manufacturer of the scanners 200A and 200B. The computer program PG, which may be a server connected via the Internet, is provided, for example, by being downloaded from a server (not depicted) managed by the manufacturer of the scanners 200A and 200B. Or, the computer program PG may be provided by being stored in a CD-ROM, a DVD-ROM, or the like.

The communication interface 190 is an interface for communicating with another device. In the first embodiment, the communication interface 190 may be a cable network interface, specifically, an interface in conformity to the standard of Ethernet (trade name).

Each of the scanners 200A and 200B includes a reader including an image sensor, a CPU as a controller for each of the scanners 200A and 2008, a volatile storage, a non-volatile storage, and a communication interface for being connected to the local area network LN (those of which are not depicted in the drawings). Each of the scanners 200A and 200B optically reads a document by using the image sensor, and generates scan image data indicating a scan image that includes the document. The image sensor is a one-dimensional image sensor in which photoelectric conversion elements, such as CCD or CMOS, are arranged in a row.

The scan image data generated may be RGB image data. The RGB image data includes pixel values. Each pixel value indicates a color of each pixel by using a color value (referred also to as an RGB value) of a RGB color system. Each RGB value includes gradation values (e.g., 256 gradations from 0 to 255) of three color components including red (R), green (G), and blue (B).

For example, each of the scanners 200A and 200B reads n page(s) of document (n is an integer of not less than one), generates n pieces) of scan image data, and generates an image file including page image data for the n page(s) by use of the n pieces) of scan image data. The image file is a Portable Document Format (PDF) file which can store page image data for multiple pages. As another example, a file in any other format such as XML Paper Specification (XPS) may be used. Each of the scanners 200A and 200B stores the image file generated in a predefined folder. In this embodiment, the image file generated is stored in the monitoring folder MF of the file storage area ST provided by the server 100 via the communication interface.

Each of the terminals 300A and 300B may be a personal computer or a smart phone. Each of the terminals 300A and 300B includes a CPU as a controller for each of the terminals 300A and 300B, a volatile storage, a non-volatile storage, and a communication interface for being connected to the local area network LN (those of which are not depicted in the drawings).

<Profile Setting Information PF>

As described above, the CPU 110 of the server 100 executes the profile setting function to generate the profile setting information PF based on a user's instruction. Specifically, the CPU 110 causes a display of each of the terminals 300A and 300B to display a profile setting screen PW as a UI screen. For example, in response to a request from the terminal 300A, the CPU 110 of the server 100 transmits, to the terminal 300A, image data indicating the profile setting screen PW, for example, image data in Hyper Text Markup Language (HTML) format. The terminal 300A causes the display to display the profile setting screen PW indicated by the image data transmitted from the server 100 by using, for example, a WEB browser function. Or, the CPU 110 may cause a display (not depicted) of the server 100 to display the profile setting screen PW.

Figure 2A:
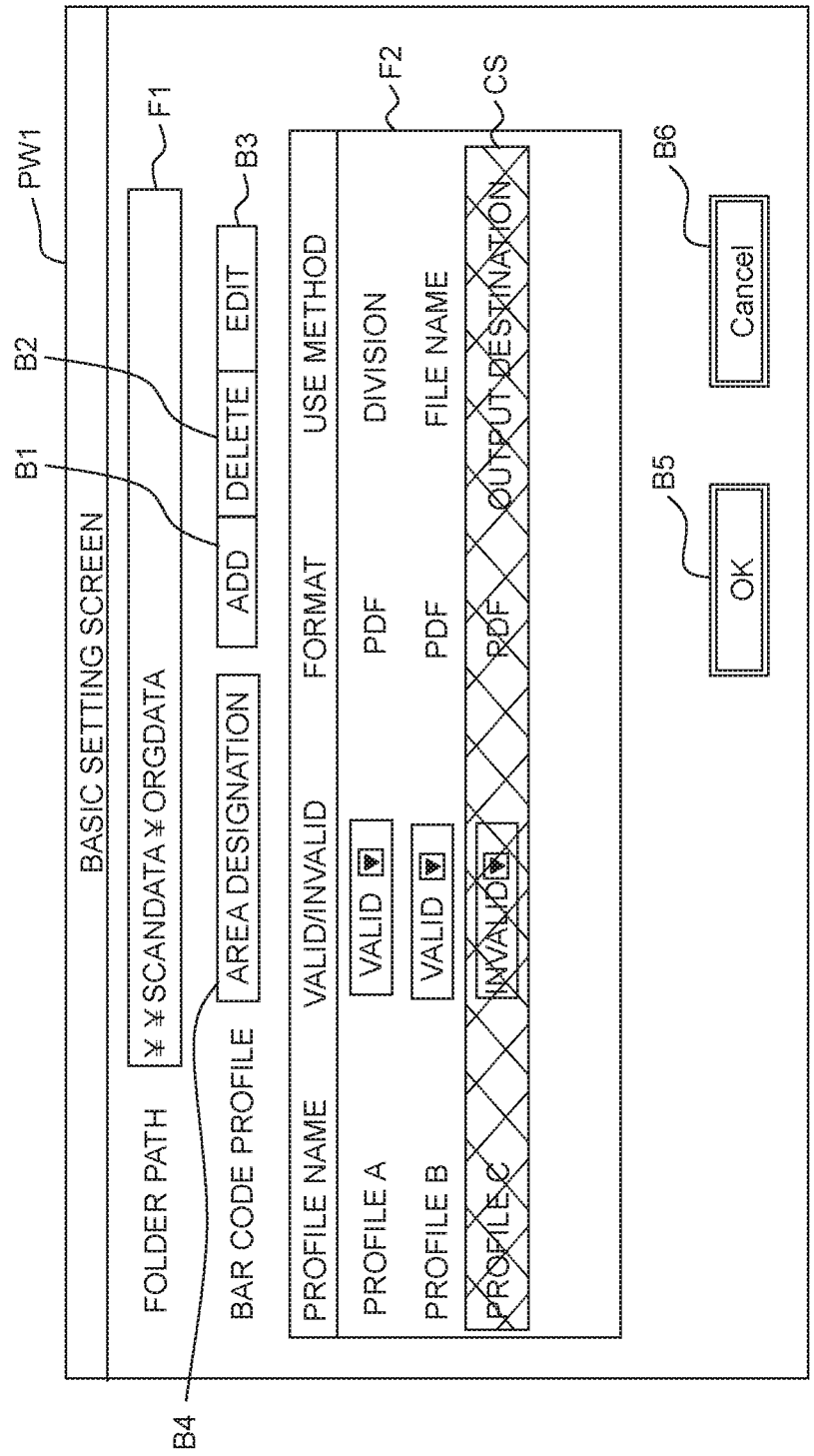
FIGS. 2A and 2B each depict an example of a profile setting screen.
Figure 2B:
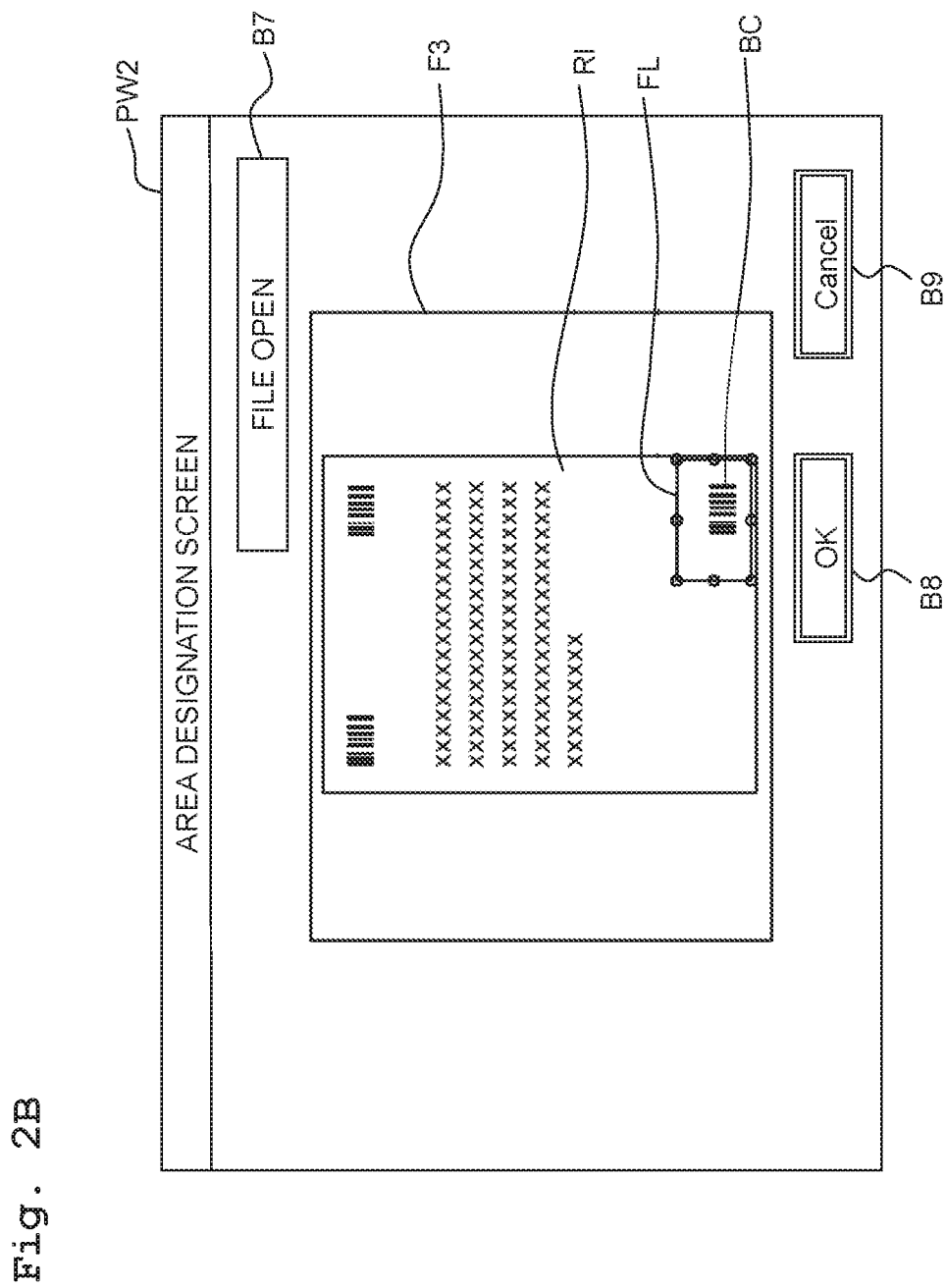

The profile setting screen PW includes a basic setting screen PW1 depicted in FIG. 2A and an area designation screen PW2 depicted in FIG. 2B. First, the basic setting screen PW1 is displayed. The CPU 110 of the server 100 acquires a user's instruction related to the profile setting information PF via the basic setting screen PW1. The basic setting screen PW1 includes a field F1 for inputting a folder path and a field F2 for inputting one or more pieces of profile definition information PD. The folder path inputted to the field F1 is a path indicating a position of the monitoring folder MF in the file storage area ST. Each piece of profile definition information PD is information defining the profile for the bar-code use processing. Each piece of profile definition information PD includes a profile name, information indicating whether the profile is valid, format information, and use-method designation information. The format information designates a format of an image file to be processed in the bar-code use processing. The formats that can be designated by using the format information include, for example, PDF and XPS. The use-method designation information is used to make the designation so that a bar code corresponding to the profile is used for any of division of the image file, designation of the file name of the image file, and designation of a folder for an output destination of the image file.

The basic setting screen PW1 further includes buttons B1 to B6 receiving user's instructions and a cursor CS. The cursor CS is used to select a piece of profile definition information PD of an operation target, from among one or more pieces of profile definition information PD inputted to the field F2. The button B1 is used to add a new piece of profile definition information PD to the field F1. The button B2 is used to delete the profile definition information PD of the operation target. The button B3 is used to edit the profile definition information PD of the operation target. The user uses those buttons to input the profile definition information PD. When the button B4 is pressed or touched in a state where the profile definition information PD of the operation target is selected by the cursor CS, the area designation screen PW2 depicted in FIG. 2B is displayed.

The area designation screen PW2 is a UI screen for generating the relative area information AI to be mapped to the profile definition information of the operation target. The area designation screen PW2 includes a field F3 for inputting an instruction to designate a reference area RA (described below) and buttons B7 to B9. A reference document RI is displayed in the field F3. Specifically, when the file selection button B7 is pressed, a file selection screen (not depicted) is displayed. The user selects, as reference-document image data, one piece of scan image data stored in the terminal 300A via the file selection screen. When the reference-document image data is selected, the reference document RI indicated by the reference-document image data is displayed in the field. F3. The field F3 includes a UI element FL in a rectangular frame shape. The size of the frame-shaped UI element FL in an X direction (a horizontal direction in FIGS. 2A and 2B), the size of the frame-shaped UI element FL in an Y direction (a vertical direction in FIGS. 2A and 2B), and a position on the reference document RI can be changed by user's operation. The user places the UI element FL having a desired position and size on the reference document RI, thus designating the position and size of the reference area RA relative to the reference document RI. For example, the user places the frame-shaped UI element FL to surround a bar code BC in a state where the reference document RI including the bar code BC positioned in a desired position is displayed in the field F3. This enables the user to appropriately and easily designate the position and size of the reference area RA.

When an OK button B8 is pressed, the CPU 110 executes area-setting processing described below to generate and store the relative area information AI. The relative area information AI indicates a relative position and a relative size of the reference area RA relative to the reference document RI. When the relative area information AI is generated, the area designation screen PW2 is no longer displayed and only the basic setting screen PW1 is displayed. When a cancel button B9 is pressed, the area designation screen PW2 is no longer displayed and only the basic setting screen PW1 is displayed without generation of the relative area information AI.

Pressing an OK button B5 in the basic setting screen PW1 causes the profile definition information PD already inputted to the basic setting screen PW1 and the relative area information AI mapped to the profile definition information PD to be stored in the non-volatile storage 130.

Next, the area-setting processing is explained with reference to FIG. 3 and FIGS. 4A to 4D. The area-setting processing is started when the OK button B8 in the area designation screen PW2 is pressed, as described above. Here, as depicted in FIG. 4A, the explanation is made assuming that the area-setting processing is started in a state where a UI element FLa that designates a reference area RAa is placed in a lower right portion of the reference document RI.

In S10, the CPU 110 acquires the size of the reference document RI (FIG. 4A) already displayed in the field F3, specifically, a size W1 of the reference document RI in an X direction and a size H1 of the reference document RI in a Y direction.

In S20, the CPU 110 acquires the position and size of the reference area RAa designated on the reference document RI. Specifically, the position and size of the frame-shaped UI element FLa placed on the reference document RI are acquired as the position and size of the reference area RAa. For example, coordinates of a specific corner of the UI element FLa. (in FIG. 4A, coordinates of an upper left corner P2a (X2a, Y2a)), a size W2a of the UI element FLa in the X direction, and a size H2a of the UI element FLa in the Y direction are acquired.

The sizes W1 and W2a in the X direction and the sizes H1 and H2a in the Y direction are indicated by the number of pixels of the reference document RI. The coordinates (X2a, Y2a) are indicated by using a coordinate system in which coordinates of a reference position on the reference document RI (in FIG. 4A, coordinates of a position of an upper left corner P1) are (0, 0) and widths, of one pixel of the reference document RI, in the X direction and the Y direction are each one.

In S30, the CPU 110 converts each of the position and the size of the reference area RAa already acquired into a ratio thereof to the reference document RI. Specifically, an X coordinate X2a of the corner P2a is converted into a value Xra (Xra=(X2a/W1)) of a coordinate system, in which the X coordinate of the corner P1 of the reference document RI is zero and the X coordinate of a corner P3 of the reference document RI is one, by diving the X coordinate X2a of the corner P2a by the size W1 of the reference document RI in the X direction. The Y coordinate Y2a of the corner P2a is converted into a value Yra. (Yra=(Y2a/H1)) of a coordinate system, in which the Y coordinate of the corner P1 of the reference document RI is zero and the Y coordinate of a corner P4 of the reference document RI is one, by dividing the Y coordinate Y2a of the corner P2a by the size H1 of the reference document RI in the Y direction. The size W2a of the reference area. RAa (the UI element FLa) in the X direction is converted into a value Wra (Wra=(W2a/W1)) in which the size W1 of the reference document RI in the X direction is one, by dividing the size W2a of the reference area RAa in the X direction by the size W1 of the reference document RI in the X direction. The size H2a of the reference area RAa (the UI element FLa) in the Y direction is converted into a value Hra (Hra=(H2a/H1)) in which the size H1 of the reference document RI in the Y direction is one, by dividing the size H2a of the reference area RAa in the Y direction by the size H1 of the reference document RI in the Y direction. This results in coordinates (Xra, Yra) indicating the relative position of the corner P2a of the reference area RAa relative to the reference document RI and the relative sizes Wra and Hra of the reference area RAa in the X direction and the Y direction relative to the reference document RI.

In S40, the CPU 110 stores the values (Xra. Yra), Wra, and Hra, as the relative area information AIa (FIG. 4B), in the volatile storage 120. The relative area information AIa is stored as part of the profile setting information PF while being mapped to the corresponding profile definition information PDa.

FIG. 4A depicts a UI element FLb that is placed in an upper left portion of the reference document RI to designate a reference area RAb. Coordinates of an upper left corner P2b of the reference area RAb (the element FLb) are (X2b, Y2b). The sizes of the reference area RAb in the X direction and the Y direction are W2b and H2b, respectively. When the area-setting processing is started in a state where the UI element FLb is placed on the reference document RI, relative area information AIb depicted in FIG. 4C is generated and stored in the area-setting processing.

FIG. 4A depicts a UI element FLc that is disposed an upper right portion of the reference document RI to designate a reference area RAc. Coordinates of an upper left corner P2c of the reference area RAc (the UI element FLc) are (X2c, Y2c). The sizes of the reference area RAc in the X direction and the Y direction are W2c and H2c, respectively. When the area-setting processing is started in a state where the UI element FLc is placed on the reference document RI, relative area information AIc depicted in FIG. 4D is generated and stored in the area-setting processing.

As described above, in this embodiment, the CPU 110 causes the display to display the area designation screen PW2 including the reference document RI and acquires an instruction designating a partial area of the reference document RI via the area designation screen PW2. Then, the CPU 110 acquires information indicating the relative position and the relative size of the partial area relative to the reference document RI, as the relative area information AI. Accordingly, the CPU 110 appropriately acquires the relative area information AI satisfying the user's intention. This enables an output image file OF satisfying the user's intension to be appropriately generated and to be output in the bar-code use processing described below.

<Bar-Code Use Processing>

The bar-code use processing is executed in a state where the profile setting information PF is recorded in the non-volatile storage 130. In the bar-code use processing, when target images (e.g., page images) indicated by a target image file (e.g., a PDF file) include a bar code, an output image file corresponding to the bar code is output by using the target image file. Here, the explanation is made assuming that three profiles A to C (FIG. 2A) defined by three pieces of profile definition information PDa to PDc are valid. The bar-code use method for the profile A is "image file division", the bar-code use method for the profile B is "file name designation", and the bar-code use method for the profile C is "output-destination folder designation". Further, it is assumed that the pieces of profile definition information PDa, PDb, and PDc are mapped to the pieces of relative area information AIa, AIb, and AIc depicted in FIGS. 4B, 4C, and 4D.

The bar-code use processing is explained with reference to FIG. 5. The bar-code use processing is constantly executed by the CPU 110 while the computer program PG runs after the server 100 is started up. In S105, the CPU 110 monitors the monitoring folder MF and determines whether an image file to be processed in the bar-code use processing (hereinafter referred also to as a target image file) is newly stored in the monitoring folder MF. The target image file is, for example, an image file in a format that is defined by the format information for each of the valid profiles A to C. In this embodiment, the target image file is a PDF file that is generated by the scanner 200A or 200B and stored in the monitoring folder MF.

When the storage of the target image file in the monitoring folder MF is not detected (S105: NO), the CPU 110 waits until the storage of the target image file is detected. When the storage of the target image file in the monitoring folder MF is detected (S105: YES), the CPU 110 acquires the target image file from the monitoring folder MF and stores the target image file in the volatile storage 120 in S110.

As depicted in FIG. 6A, an image file IF is a PDF file that includes five pieces of page image data indicating five page images PIa to PIe, respectively. Numerals 1 to 5 written above the respective page images are page numbers indicating the order of pages of the five page images PIa to PIe. Each of the five page images PIa to PIe indicates a document.

The page image PIb of the second page includes a bar code BCb, the page image PIcof the third page includes a bar code BCc, the page image PId of the fourth image includes a bar code BCd, and a page image PIe of the fifth image includes a bar code BCe. The page image PIa of the first page includes no bar code. The bar codes BCb and BCd are positioned at right lower portions of the page images PIb and PId, respectively. Each of the bar codes BCb and BCd is a bar code for division by which a dividing position in the image file is designated. The bar code BCc, which is positioned at an upper left portion of the page image PIc, is a bar code for file name designation by which the file name is designated. The bar code BCe, which is positioned at an upper right portion of the page image PIe, is a bar code for output-destination designation by which the output destination of the image file is designated.

In the bar code for division, any piece of information is coded. In the bar code for file name designation, a file name to be designated is coded. In the bar code for output-destination designation, a position, of a folder for an output destination to be designated, in the file storage area ST is coded, specifically, a path of the folder is coded. For example, any of the storage folders SF1 to SF3 depicted in FIG. 1 is designated as the folder for the output destination. The following explanation is made assuming that the image file IF depicted in FIG. 6A is acquired as the target image file in S110.

In S115, the CPU 110 analyzes the pieces of page image data indicating the respective page images PIa to PIe included in the target image file IF and searches the bar codes included in the page images PIa to PIe. Since the processing of searching the bar codes is known processing including pattern matching etc., the explanation therefor will be omitted. In FIG. 6A, the four bar codes BCb to BCe are detected.

In S120, it is determined whether one or more of bar codes is/are detected based on the analysis in S115. When no bar code is detected (S120: NO), the CPU 110 skips over the processing of S125 to S150 described below and executes the processing of S155. When one or more of bar codes is/are detected (S120: YES), the CPU 110 executes the processing of S125.

In S125, the CPU 110 selects a page image including the bar code detected, as a target page image, from among the page images PIa to PIe included in the target image file IF. In FIG. 6A, the page images PIb to PIe including the bar codes BCb to BCe are selected as the target page images one by one.

In S130, the CPU 110 acquires the size of the target page image. Specifically, the CPU 110 counts the number of pixels of the target page image in the X direction to acquire it as the size of the target page image in the X direction, and counts the number of pixels in the Y direction to acquire it as the size of the target page image in the Y direction.

Figure 7A:
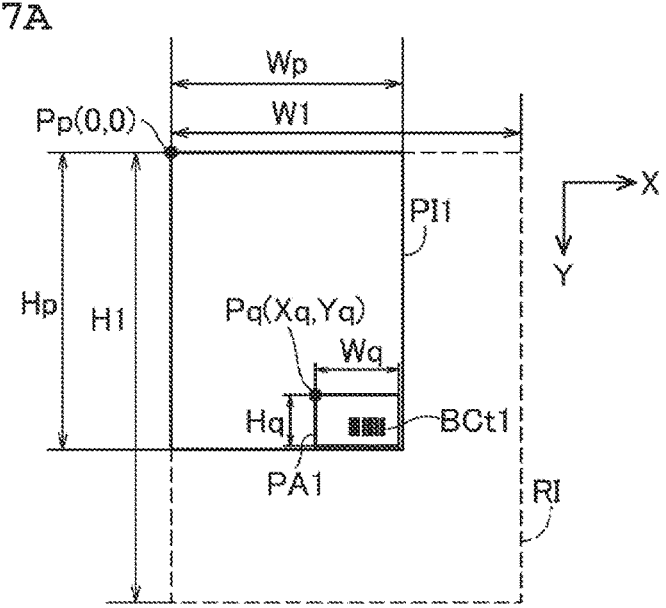
FIGS. 7A and 7B each depict an exemplary page image.

Here, the page images may be generated at various kinds of resolution (e.g., 300 dpi, 600 dpi, and 1200 dpi) depending on the specification and the setting of the scanner (e.g., each of the scanners 200A and 200B depicted in FIG. 1) that generates the target image file IF including the page images. The difference in resolutions results in the difference in sizes of the page images even when the size of the document to be read is a predefined size (e.g., A4 size). For example, a page image PI1 of FIG. 7A is an image generated by reading a document having the same size as the reference document RI. The resolution, of the page image data indicating the page image PI1, in the X direction and the Y direction at the time of generation of the page image data is lower than the resolution, of the reference-document image data indicating the reference document RI, in the X direction and the Y direction at the time of generation of the reference-document image data. Thus, the size Wp (the number of pixels) of the page image PI1 in the X direction and the size Hp (the number of pixels) of the page image PI1 in the Y direction are smaller than the size W1 (the number of pixels) of the reference document RI in the X direction and the size H1 (the number of pixels) of the reference document RI in the Y direction.

The resolution in the X direction may be different from the resolution in the Y direction depending on the specification and the setting of the scanner. In that case, the ratio of the size in the X direction of the docwnent to be read to the size in the Y direction of the document to be read (an aspect ratio) is different from an aspect ratio of the page image to be generated. For example, a page image PI2 of FIG. 79 is an image generated by reading a docwnent having the same size as the reference document RI. The resolution, of the page image data indicating the page image PI2, in the Y direction at the time of generation of the page image data is the same as the resolution, of the reference-document image data indicating the reference document RI, in the Y direction at the time of generation of the reference-document image data. The resolution, of the page image data indicating the page image PI2, in the X direction at the time of generation of the page image data is higher than the resolution, of the reference image data, in the X direction at the time of generation of the reference image data. Thus, the size Hs (the number of pixels) of the page image PI2 in the Y direction is the same as the size H1 (the number of pixels) of the reference document RI in the Y direction. The size Ws (the number of pixels) of the page image PI2 in the X direction is larger than the size W1 (the number of pixels) of the reference document RI in the X direction.

Each of the scanners 200A and 200B reads a document while moving the document relative to the one-dimensional image sensor by moving at least one of the document and the image sensor in a sub-scanning direction. This varies the resolution in a direction, of the X direction and the Y direction, corresponding to the sub-scanning direction depending on the variation in velocity of relative movement (e.g., the conveyance of the document and the movement of the one-dimensional image sensor) in the sub-scanning direction. This may vary the size of the page image in the corresponding direction.

From the above, the size of the target page image may be different from the size of the reference document RI used for generating the relative area information AIa to AIc.

In S135, the CPU 110 identifies a profile corresponding area PA in the target page image based on the size of the target page image and valid relative-area information AI. The valid relative-area information AI is relative area information AI that is mapped to profile definition information PD defining a valid profile. The profile corresponding area PA is a rectangular area that is identified in the page image based on the relative area information AI. The profile corresponding area PA corresponds to a profile defined by the profile definition information PD that is mapped to the relative area information AI. When s piece(s) of valid profile (s is an integer of one or more) exist(s), s piece(s) of profile corresponding area PA is/are identified in one target page image. In this embodiment, three profile corresponding areas PA corresponding to three profiles A to C are identified.

As an example, a profile corresponding area PA1 that is identified based on the relative area information AIa in FIG. 4B when the target page image is the page image PI1 depicted in FIG. 7A, is explained. As information identifying the profile corresponding area PA1, coordinates (Xq, Yq) of an upper left corner Pq of the profile corresponding area PA1, a size Wq of the profile corresponding area PA1 in the X direction, and a size Hq of the profile corresponding area PA1 in the Y direction are calculated. The coordinates (Xq, Yq) of the corner Pq are indicated by using a coordinate system in which coordinates of the position of an upper left corner Pp as the reference position of the page image PI1 are (0, 0) and widths of one pixel of the page image PI1 in the X direction and the Y direction are each one. The sizes Wq and Hq of the profile corresponding area PA1 are indicated by using the number of pixels.

As depicted in FIG. 7A, a specific calculation method uses: values Xra, Yra (FIG. 4B) that indicate, by using a ratio, the X coordinate and the Y coordinate of the corner P2a of the reference area RAa included in the relative area information AIa; and values Wra, Hra (FIG. 4B) that indicate, by using a ratio, the sizes of the reference area RAa in the X direction and the Y direction. For example, the X coordinate Xq of the corner Pq is calculated by multiplying the value Xra, which indicates the X coordinate of the corner P2a by using the ratio, by the size Wp of the page image PI1 in the X direction (Xq=(Xra×Wp)). The Y coordinate Yq of the corner Pq is calculated by multiplying the value Yra, which indicates the Y coordinate of the corner P2a by using the ratio, by the size Hp of the page image PI1 in the Y direction (Yq (Yra×Hp)). The size Wq of the profile corresponding area PA in the X direction is calculated by multiplying the value Wra, which indicates the size of the reference rea RAa in the X direction by using the ratio, by the size Wp of the page image PI1 in the X direction (Wq (Wra×Wp)). The size Hq of the profile corresponding area PA in the Y direction is calculated by multiplying the value Hra, which indicates the size of the reference rea RAa in the Y direction by using the ratio, by the size Hp of the page image PI1 in the Y direction (Hq=(Hra×Hp)). As described above, the values (Xq, Wq) indicating the position of the profile corresponding area PA1 in the X direction and the size of the profile corresponding area PA1 in the X direction are calculated independently of the values (Yq, Hq) indicating the position of the profile corresponding area PA1 in the Y direction and the size of the profile corresponding area PA1 in the Y direction. As a result, as depicted in FIG. 7A, the profile corresponding area. PA1 is identified so that the size, position, and shape of the profile corresponding area PA1 relative to the page image PI1 are equal to the size, position, and shape (FIG. 4A) of the reference area RAa relative to the reference document RI.

Figure 7B:
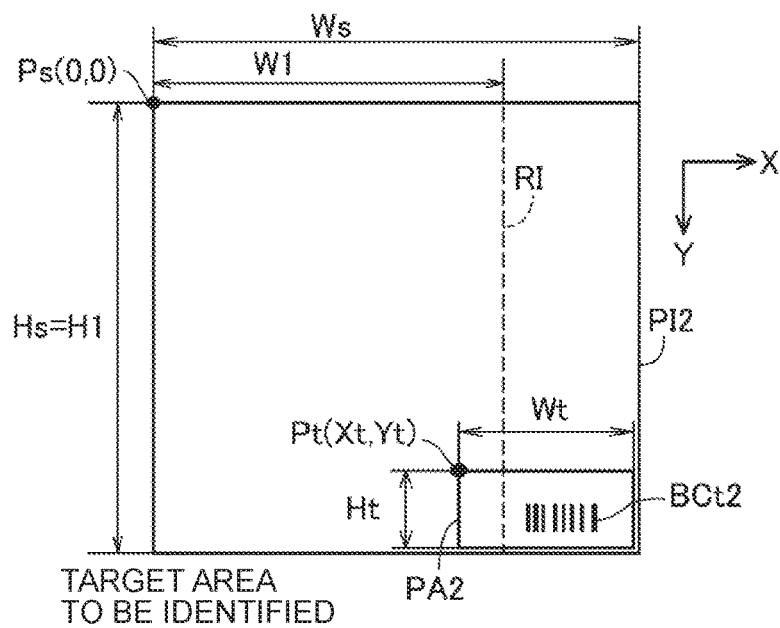

Similarly, when the target page image is the page image PI2 depicted in FIG. 7B, coordinates (Xt, Yt) of a corner Pt and widths Wt and Ht in the X direction and the Y direction are calculated by using the values Xra, Yra, Wra, and Hra included in the relative area information AIa and the widths Ws and Hs of the page image PI2 in the X direction and the Y direction, as depicted in FIG. 7B, As a result, as depicted in FIG. 7B, a profile corresponding area PA2 is identified so that the size, position, and shape of the profile corresponding area PA2 relative to the page image PI2 are equal to the size, position, and shape (FIG. 4A) of the reference area RAa relative to the reference document RI.

As described above, even when at least one of the size of the target page image in the X direction and the size of the target page image in the Y direction is different from the size of the reference document RI (FIG. 4A) in the X direction and/or the size of the reference document RI in the Y direction, the profile corresponding area PA can be appropriately determined on the target page image. For example, regarding the page images PI1 and PI2 in FIGS. 7A and 7B, bar codes BCt1 and BCt2 are arranged at respective lower right positions, namely, at positions where the reference area RAa is arranged relative to the reference document RI depicted in FIG. 4A. As depicted in FIGS. 7A and 7B, the profile corresponding areas PA1 and PA2 identified in the page images PI1 and PI2 are appropriately identified in positions including the bar codes BCt1 and BCt2.

Figure 8A:
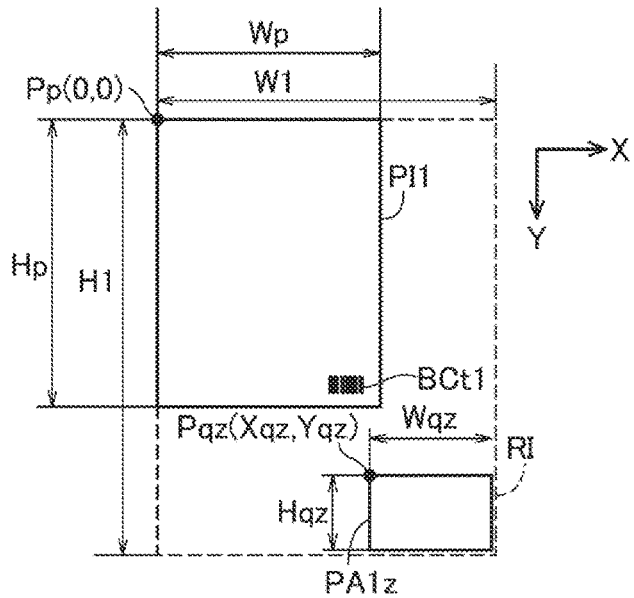
FIGS. 8A and 8B are illustrative views of a comparative example.
Figure 8B:
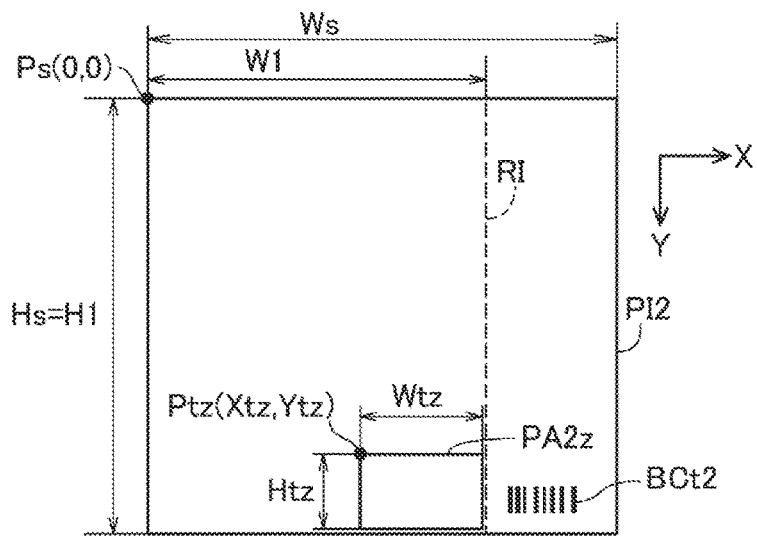

When a piece of area information that identifies the reference area RAa on the reference document RI depicted in FIG. 4A by using an absolute value, is used in place of the relative area information AIa, the profile corresponding area may not be appropriately identified. That case is explained as a comparative example with reference to FIGS. 8A and 8B. The area information of that case includes coordinates (X2a, Y2a) of the corner P2a of the reference area RAa depicted in FIG. 4A and the sizes W2a and H2a of the reference area RAa in the X direction and the Y direction. In the comparative example, as depicted in FIGS. 8A and 8B, coordinates (Xqz, Yqz), (Xtz, Ytz) of corners Pqz, Ptz of the profile corresponding areas PA1z, PA2z are determined to the coordinates (X2a, Y2a) of the corner P2a of the reference area RAa. Sizes Wqz, Wtz in the X direction and sizes Hqz, Htz in the Y direction of the profile corresponding areas PA1z, PA2z are determined to the size W2a in the X direction and the size H2a in the Y direction of the reference area RAa. In that case, when the size of the target page image is different from the size of the reference document RI, the profile corresponding area may not be determined appropriately. For example, in FIG. 8A, the profile corresponding area PA1z is identified outside the page image PI1 that is smaller than the reference document RI, and the profile corresponding area PA1z is not identified in an appropriate position on the page image PI1 including the bar code BCt1. In FIG. 8B, the profile corresponding area PA2z is identified in a position, of the page image PI2, close to the center in the X direction, the page image P12 having a size in the X direction larger than that of the reference document RI. The profile corresponding area PA2z is not identified in an appropriate position (a lower right portion) on the page image PI1 including the bar code BCt2.

Figure 5:
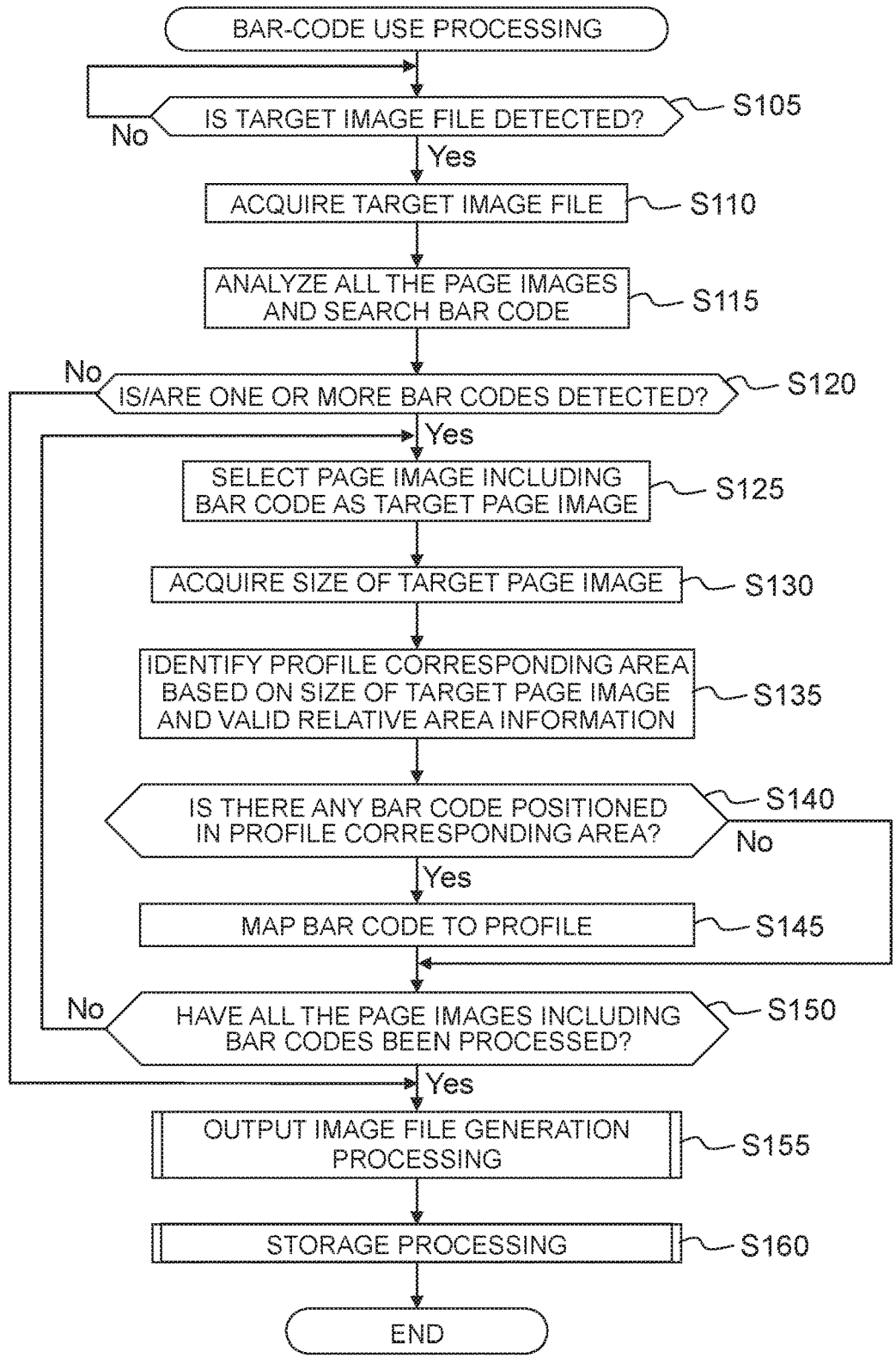
FIG. 5 is a flowchart of bar-code use processing.

In S140 of FIG. 5, the CPU 110 determines whether there is a bar code positioned in the profile corresponding area PA identified. For example, in this embodiment, it is determined whether there are bar codes respectively positioned in the three profile corresponding areas PA corresponding to the three profiles A to C. For example, when the profile corresponding area PA1 of FIG. 7A is identified, the bar code BCt1 is positioned in the profile corresponding area PA1. Thus, it is determined that there is the bar code positioned in the profile corresponding area PA.

When there is the bar code positioned in the profile corresponding area. PA (S140: YES), the CPU 110 maps, in S145, the bar code in the profile corresponding area PA to the profile corresponding to the profile corresponding area PA. For example, when the page images PIb and PId of the image file IF depicted in FIG. 6A are the target page images, the bar codes BCb and BCd positioned in the respective lower right portions are mapped to the profile A. When the page image PIc is the target page image, the bar code BCc positioned in the upper left portion is mapped to the profile B. When the page image PIe is the target page image, the bar code PCe positioned in the upper right portion is mapped to the profile C. When there is no bar code positioned in the profile corresponding area PA (S140: NC)), the CPU 110 skips over S145.

In S150, the CPU 110 determines whether all the page images including the bar codes have been processed. When all the page images including the bar codes are not yet processed (S150: NO), the CPU 110 returns to S125 and selects an unprocessed page image. When all the page images including the bar codes have been processed (S150: YES), the CPU 110 executes the processing of S155. At this time, for example, the bar codes BCb, BCd in FIG. 6A are mapped to the profile A for division of the image fie, the bar code BCc is mapped to the profile B for designation of the file name, and the bar code BCe is mapped to the profile C for designation of the folder of the output destination.

In S155, the CPU 110 executes output-image-file generation processing of generating one or more output image files OF by use of the target image file IF. The output-image-file generation processing is executed based on a correspondence relation between the bar codes detected and the profiles A and B.

The output-image-file generation processing is explained with reference to FIG. 9. In S210, the CPU 110 determines whether the bar codes detected in the target image file IF include a barcode mapped to the profile A for division of the image file. In FIG. 6A, the CPU 110 determines that the bar codes detected in the target image file IF include two bar codes BCh and BCd mapped to the profile A.

When the bar codes detected in the target image file IF include any bar code mapped to the profile A for division of the image file (S210: YES), the CPU 110 divides, in S220, the target image file IF along the page image including the bar code (by using the page image including the bar code as a break). For example, when m piece(s) of page image including k1th image, k2th image, k3th image, . . . , and km-th image (m is an integer of not less than one, and k1 to km are integers of not less than one and not more than K), the m piece(s) of page image included in the image file IF that includes K pieces of page image (K is an integer of not less than two), includes the bar code(s) for division, (m+1) pieces of output image file OF1 to OF(m+1) are generated. The output image file OF1 includes k1 pieces of page image data that indicate 1 to k1th page images. The output image file OFi (i is an integer satisfying 2≤i≤m) includes {ki−k(i−1)} pieces of page image data that indicate {k(i−1)+1}-th to ki-th page images. The output image file OF (m+1) includes (K−km) pieces of page image data that indicate (km+1)-th to Kth page images. In FIG. 6A, the second page image PIb and the fourth page image PId of the target image file IF include the bar codes BCb and BCd for division respectively, and thus three output image files OF1 to OF3 are generated (FIG. 63). The first output image file OF1 includes two pieces of page image data that indicate the first page image PIa and the second page image PIb. The second output image file OF2 includes two pieces of page image data that indicate the third page image PIc and the fourth page image PId. The third output image file OF3 includes one piece of page image data that indicates the fifth page image PIe. As a modified embodiment, the target image file IF may be divided so that the output image file OF1 includes (k1−1) pieces of page image data indicating the first to (k1−1)-th page images and the output image file OFi (i is an integer satisfying 2≤i≤m) includes {ki−k(i−1)} pieces of page image data indicating k(i−1)-th to (ki−1)-th page images.

The file names of (m+1) pieces of output image file OF1 to OF(m+1) generated by division are determined, for example, to default file names.

When the bar codes detected in the target image file IF include no bar code mapped to the profile A for division of the image file (S210: NO), the CPU 110 skips over S220. In that case, the target image file IF becomes the output image file as is.

In S230, the CPU 110 determines whether the bar codes detected in fixe target image file IF include a bar code mapped to the profile B for designation of the file name. In FIG. 6A, the CPU 110 determines that the bar codes detected in the target image file IF include the bar code BCc mapped to the profile B.

When the bar codes detected in the target image file IF include any bar code mapped to the profile B for designation of the file name (S230: YES), the CPU 110 changes, in S240, the file name of the output image file including the page image that includes the bar code, by use of information indicated by the bar code (referred to as bar code information). When the CPU 110 skips over the S220 and the target image file IF becomes the output image file OF as is, the file name of the output image file OF is changed. When the CPU 110 executes S220 to generate (m+1) pieces of output image file OF1 to OF(m+1), the file name of the output image file including the page image that includes the bar code, among the (m+1) pieces of output image file OF1 to OF(m+1), is changed. The file name after change is determined to a string of letters indicated by the bar code. The file name of the output image file only including the page image that includes no bar code is not changed and the default file name is maintained. In FIG. 6B, of the three output image files OF to OF 3, the file name of the second output image file OF2, which includes the page image Pk including the bar code BCc mapped to the profile B, is changed to a string of letters indicated by the bar code BCc.

When the bar codes detected in the target image file IF include no bar code mapped to the profile B for designation of the file name (S230: NO), the CPU 110 skips over S240.

In S160 of FIG. 5, the CPU 110 executes storage processing of storing the output image files OF in any of folders in the file storage area ST.

The storage processing is explained with reference to FIG. 10. The CPU 110 determines in S310 whether the bar codes detected in the target image file IF include a bar code mapped to the profile C for designation of the folder of the output destination. In FIG. 6A, the CPU 110 determines that the bar codes detected in the target image file IF include the bar code BCe mapped to the profile C.

When the bar codes detected in the target image file IF include any bar code mapped to the profile C for designation of the folder of the output destination (S310: YES), the CPU 110 determines in S320 the folder for storing the output image file OF based on the information indicated by the bar code (bar code information). Specifically, the output image file OF including the page image that includes the bar code is stored in a folder designated by the bar code information. When the CPU skips over S220 of FIG. 9 and the target image file IF becomes the output image file OF as is, the folder for storing the output image file OF is determined to the folder designated by the bar code information. When the CPU 110 executes S220 to generate (m+1) pieces of output image file OF1 to OF(m+1), the folder for storing the output image file, of the (m+1) pieces of output image file OF1 to OF(m+1), which includes the page image including the bar code is determined to the folder designated by the bar code information. Then, the folder for storing the output image file only including the page image that includes no bar code is determined to a default folder. In FIG. 6B, the folder for storing the third output image file OF3 including the page image PIe that includes the bar code BCe is determined to a folder designated by information indicated by the bar code BCe (e.g., a path). The folders for storing the other output image files OF1 and OF2 are determined to default folders.

Each of the folder designated by the bar code information and the default folders is, for example, any of the storage folders SF1 to SF3. Each of the folder designated by the bar code information and the default folders may be another calculation device connected via the local area network LN, for example, a folder in the non-volatile storage 130 of the terminal 300A.

When the bar codes detected in the target image file IF include no bar code mapped to the profile C for designation of the folder of the output destination (S310: NO), the CPU 110 determines in S330 that the folder for storing the output image file OF is determined to the default folder. In that case, even when the CPU 110 skips over S220 and the target image file IF is the output image file OF, or even when the CPU 11 executes S220 to generate (m+1) pieces of output image file OR to OF(m+1), the folder for storing all the output image files OF is determined to the default folder.

In S340, the CPU 110 stores the output image files OF in the folder determined in S320 or S330 and ends the storage processing.

According to the embodiment, the CPU 110 uses the target image file IF to identify the profile corresponding area PA in each of the page images PIa to PIe as the target image (S135 of FIG. 5). In this embodiment, three profile corresponding areas PA based on three pieces of relative area information AIa to AIc are identified for one target page image. The profile corresponding area PA based on the relative area information AIa is, for example, an area that is in a position, relative to the target page image, indicated by the relative area information AIa and that has a size, relative to the size of the target page image, indicated by the relative area information AIa (FIGS. 7A and 7B). The CPU 110 analyzes the area in the page image including the profile corresponding area PA (in this embodiment, the whole page image) and determines whether there is a bar code in the profile corresponding area PA (S115, S110, and S145 of FIG. 5). The CPU 110 executes multiple kinds of output processing of outputting the output image files OF1 to OF3 (FIG. 6B) based on the target image file IF (FIG. 6A), each kind of output processing being selected depending on the analysis result of the profile corresponding area PA. Specifically, the CPU 110 executes the output-image-file generation processing indicated in FIG. 9 and the storage processing indicated in FIG. 10. As a result, the target image file IF can be appropriately analyzed. For example, since the profile corresponding area PA is appropriately identified, the target image file IF can be appropriately analyzed irrespective of the resolution of the page image data of the target image file IF at the time of generation of the page image data and the sizes of the page images PIa to PIe. Accordingly, it is possible to appropriately execute the output processing corresponding to the target image file IF. For example, as described above, it is possible to generate the output image files OF which are appropriately divided corresponding to the bar codes BCb to BCe and to which the respective file names are determined appropriately, and multiple kinds of output processing can be executed to appropriately store the output image files OF in the folders.

In this embodiment, the relative position and the relative size of the profile corresponding area PA in the X direction relative to the target page image are identified independently of the relative position and the relative size of the profile corresponding area PA in the Y direction relative to the target page image (FIGS. 7A and 79). As a result, the profile corresponding area PA can be identified more appropriately. For example, even when one or both of the resolution in the X direction and Y direction of the reference document data indicating the reference document RI and the resolution in the X direction and Y direction of the page image data of the target image file IF at the time of generation of the page image data vary, the profile corresponding area PA can be identified appropriately.

In this embodiment, the CPU 110 monitors the monitoring folder MF that is a storage area for storing the target image file IF generated by the scanner 200A or 200B, and detects that the target image file IF is stored in the monitoring folder MF (S105 in FIG. 5). When the CPU 110 detects that the target image file IF is stored in the monitoring folder MF (S105: YES), the CPU 110 acquires the target image file IF (S110). In that case, the CPU 110 of the server 100 has difficulty in acquiring information about the scanner generating the target image file IF and information about the generation of the target image file IF, such as the resolution at the time of generation of the target image file IF. In this embodiment, however, it is possible to appropriately execute the output processing corresponding to the target image file IF by appropriately analyzing the target image file IF without the above information.

In this embodiment, the relative area information AIa includes (FIG. 4B) the information indicating the relative position of the corner P2a of the reference area RAa relative to the reference position P1 of the reference document RI (i.e., Pra (Xra, Yra)) and the information indicating the relative size of a side of the reference area RAa relative to a side of the reference document RI (i.e., Wra, Hra). As a result, it is possible to appropriately identify the profile corresponding area PA in the target page image based on the relative area information AIa.

In this embodiment, the relative area information AIa includes the information (Xra, Yra) that indicates the coordinates of the position Pra of the reference area RAa by using the ratio with respect to the sizes W1, H1 of the reference document RI. As a result, it is possible to appropriately identify the profile corresponding area. PA based on the relative area information AIa that appropriately indicates the relative position of the reference area RAa.

Further, in this embodiment, the relative area information AIa includes the information (Wra, Hra) indicating the ratio of the size of the reference area RAa to the sizes W1, H1 of the reference document RI. As a result, it is possible to appropriately identify the profile corresponding area PA based on the relative area information Ma that appropriately indicates the relative size of the reference area RAa.

Further, the CPU 110 acquires multiple pieces of relative area information AIa to AIc indicating the relative positions and the relative sizes of the reference areas RAa to RAc (S400 of FIG. 3, FIGS. 4B to 4D). The CPU 110 identifies profile corresponding areas PA based on the multiple pieces of relative area information AIa to AIc (S135 of FIG. 5), and analyzes the area (in this embodiment, the whole page image) including the profile corresponding areas PA (S115, S140, and S145 of FIG. 5). The CPU 110 executes the output-image-file generation processing (FIG. 9) or the storage processing (FIG. 10) depending on the analysis result of each of the profile corresponding areas PA. As a result, the output image file OF can be appropriately output (stored) depending on the analysis result of each of the profile corresponding areas PA.

More specifically, the CPU 110 analyzes whether there is a bar code in each profile corresponding area PA (S115, S140, and S145 of FIG. 5). When there is a bar code in the profile corresponding area PA, the CPU 110 executes a kind of output processing; when there is no bar code in the profile corresponding area PA, the CPU 110 executes another kind of output processing (e. S210 and S230 of FIG. 9 and S310 of FIG. 10). As a result, each kind of output processing can be appropriately executed depending on whether the bar code is present in the profile corresponding area PA.

The pieces of relative area information AIa to AIc are common to the page images PIa to PIe (FIG. 6A). The CPU 110 identifies the profile corresponding areas PA for the respective page images (e.g., the page images PIb to PIe including the bar codes) based on the relative area information AIa to AIe. Then, each kind of output processing is executed depending on the analysis result of the profile corresponding area PA in each of the page images PIa to PIe. As a result, the target image file IF including pieces of page image data can be appropriately analyzed to execute the output processing appropriately.

For example, when the second page image includes, in its profile corresponding area PA mapped to the profile A, a bar code, the target image file is divided along the second page image (by using the second page image as a break). When the third page image includes, in its profile corresponding area PA mapped to the profile A, a bar code, the target image file is divided along the third page image (FIG. 6B), For example, when the page image PIb of FIG. 6A includes the bar code BCb mapped to the profile A, the first output image file OF1 and the second output image file OF2 are generated by the division. The first output image file OF1 includes one or more pieces of first page image data (e.g., the page image data indicating the page images PIa and PIb) including the page image data that indicates the page image PIB including the bar code BCb. The second output image file OF2 includes one or more pieces of second page image data (e.g., the page image data indicating the page images PIc and PId) different from the first page image data. As a result, output image files can be output depending on whether each of the page images includes, in its profile corresponding area PA, a bar code.

Figure 10:
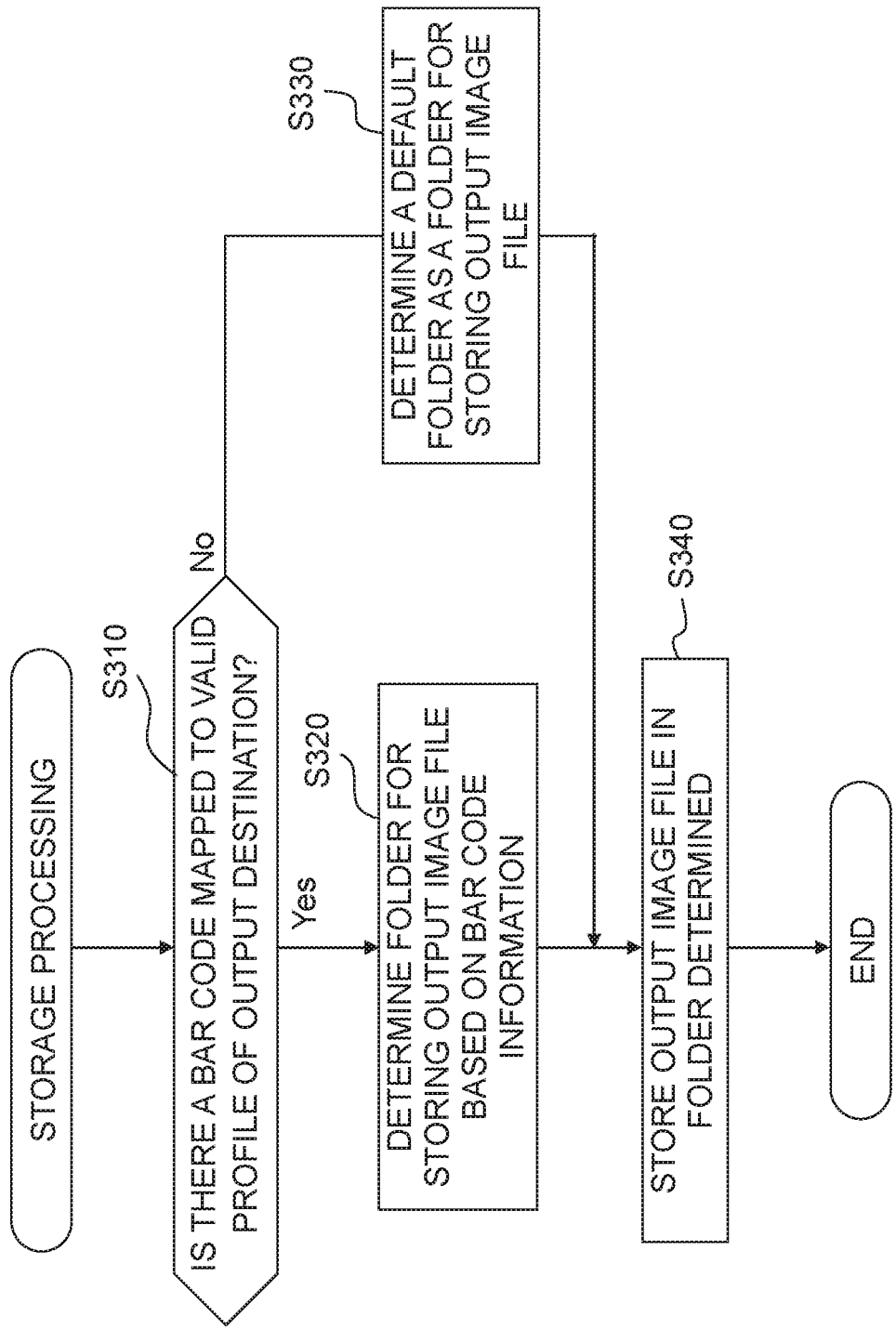
FIG. 10 is a flowchart of storage processing.

As understood from the above description, the combination of the output-image-file generation processing indicated in FIG. 9 and the storage processing indicated in FIG. 10 is exemplary output processing. The target image file IF is exemplary target image data. The profile corresponding area PA is an exemplary target image. The bar code is an example of a specific kind of image.

Modified Embodiment

In the above embodiment, as depicted in FIG. 4B, the relative area information AIa includes the values (Xra. Yra) that indicate the coordinates of the corner P2a of the reference area RAa by using the ratio. The present teaching, however, is not limited thereto. For example, the relative area information AIa may include both the values (X2a, Y2a) that indicate the coordinates of the corner P2a by using the absolute value and the values W1, H1 that indicate the sizes of the reference document RI. In that case, when the CPU 110 identifies, in S135 of FIG. 5, the profile corresponding area. PA corresponding to the relative area information Ma, the values (X2a, Y2a), W1, and H1 may be used to calculate the values (Xra, Yra) that indicate the coordinates of the corner P2a, by using the ratio, and the values (Xra, Yra) may be used to identify the profile corresponding area PA. The same is true on the pieces of relative area information AIb and AIc.

In the above embodiment, the relative area information AIa includes the values (Wra, Hra) that indicate the sizes of the reference area RAa by using the ratio, as depicted in FIG. 4B. The present teaching, however, is not limited thereto. For example, the relative area information AIa may include both the values (W2a, H2a) that indicate the sizes of the reference area RAa by using the absolute value and the values W1, H1 that indicate the sizes of the reference document RI. In that case, when the profile corresponding area PA corresponding to the relative area information AIa is identified in S135 of FIG. 5, the values (W2a, H2a). W1, and H1 may be used to calculate the values (Wra, Hra) that indicate the coordinates of the corner P2a by using the ratio, and the values (Wra, Hra) may be used to identify the profile corresponding area PA. The same is true on the pieces of relative area information AIb and AIc.

In the above embodiment, the relative area information AIa includes the values (Xra, Yra) that indicate the coordinates of the corner P2a of the reference area RAa by using the ratio and the values (Wra, Hra) that indicate the sizes of the reference area RAa by using the ratio, as depicted in FIG.

4B. The present teaching, however, is not limited thereto. For example, the relative area information AIa may include the values (Xra, Yra) that indicate the coordinates of the corner P2a of the reference area RAa and values (Xra2, Yra2) that indicate coordinates of a corner, which is an opposite angle of the corner P2a.

In the above embodiment, the position and size of the profile corresponding area PA in the X direction are determined independently of the position and size of the profile corresponding area PA in the Y direction. As a result, as depicted in FIG. 7B, when the aspect ratio of the page image PI2 is different from the aspect ratio of the reference document RI, the aspect ratio of the profile corresponding area PA2 identified is different from the aspect ratio of the reference area RAa. In place of this, for example, when it is not presumed that the aspect ratio of the page image PI2 is different from the aspect ratio of the reference document RI, the relative area information AIa may include the values (Xra, Yra) that indicate the coordinates of the corner P2a of the reference area RAa, the size Wra of the reference area RAa in the X direction, and an aspect ratio AR of the reference area RAa. In that case, the aspect ratio of the profile corresponding area PA2 identified is constantly equal to the aspect ratio of the reference area RAa.

In the above embodiment, the CPU 110 acquires the target image file IF from the monitoring folder MF by monitoring the monitoring folder MF (S105 of FIG. 5). In place of this, the CPU 110 may acquire the target image file IF generated by the scanner 200A or 200B by receiving it from the scanner 200A or 200B.

Although the valid profiles A to C can be set in the above embodiment, it is allowable to set only one profile.

In the above embodiment, the target image data is the target image file IF including multiple pieces of page image data. The target image data, however, may be one piece of scan image data indicating one document. In that case, the bar-code use method for division of the image file may be excepted, and only the bar-code use method for designation of the file name and the bar-code use method for designation of the folder of the output destination may be used.

In the above embodiment, whether the bar code is present in the profile corresponding area PA is analyzed and each kind of output processing is executed based on the analysis result. The present teaching, however, is not limited thereto. For example, in place of the bar code, a two-dimensional code image, such as a QR code (tradename), may be used. For the profile for division of the image file, a specific kind of mark, such as a circle, may be used instead of the bar code. For the profile for designation of the file name and the profile for designation of the folder of the output destination, for example, a string of letters indicating the file name and a string of letters indicating the folder path may be used instead of the bar code.

In the above embodiment, the reference area RAa indicated by the relative area information AIa is set on the reference document RI based on a user's instruction acquired via the area designation screen PW2. In place of this, the reference area RAa may be an area that is set on the reference document RI in advance. Further, the relative area information AIa may be information that is set in advance to indicate the reference area RAa.

Figure 3:
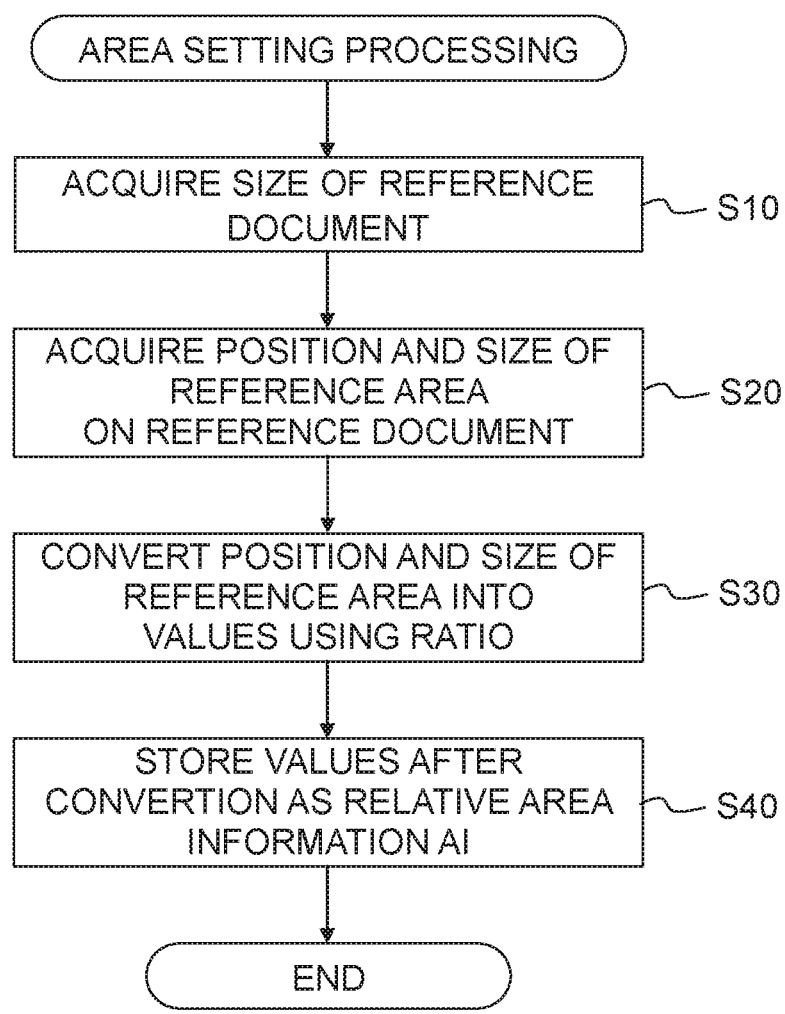
FIG. 3 is a flowchart of area-setting processing.
Figures 4A, 4B, 4C, 4D:
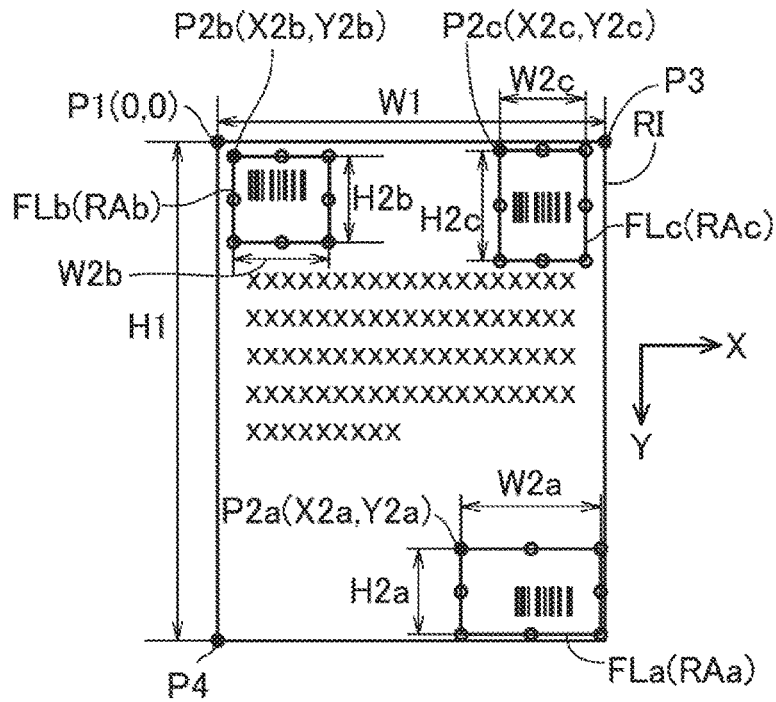
FIGS. 4A to 4D are illustrative views of the area-setting processing.

In the above embodiment, the area-setting processing indicated in FIG. 3 and the bar-code use processing indicated in FIG. 5 are executed by the CPU 110 of the server 100. The present teaching, however, is not limited thereto. Those kinds of processing may be executed on the target image file IF which is generated by the scanner 200A or 200B, by use of the CPU of the scanner 200A or 200B.

In the above embodiment, the target image file IF is a file including scan data that is generated by optically reading a document by use of the scanner 200A or 200B. In place of this, the target image file IF may be a file including photographed image data that is generated by causing a digital camera to optically photograph a document by use of a two-dimensional image sensor.

The server 100 depicted in FIG. 1 may be any other unit or configuration. For example, apparatuses (e.g., computes) communicating with each other via a network may provide the entire function of the server 100 by making the respective apparatuses execute part of the function of the server 100.

In the embodiment, the configuration achieved by hardware may be partially replaced with software. Instead, the configuration achieved by software may be partially or entirely replaced with hardware.

When part or all of the functions of the present teaching is/are achieved by a computer program, the program may be provided by being stored in a computer-readable storage medium (e.g., a non-transitory storage medium). The program may be used by being stored in a storage medium (a computer-readable storage medium) which is the same as or different from the storage medium when being provided. The computer readable storage medium is not limited to portable storage mediums such as a memory card and CD-ROM, but also may include any internal storage of the computer such as a ROM, and any external storage apparatus connected to the computer such as a hard disk drive.

As above, the present teaching has been explained with the embodiment and modified embodiments. The embodiments described above are provided to facilitate understanding of the present teaching, and the present teaching is not limited to those. The present teaching may be changed or modified without departing from the gist and the scope of the claims below, and includes equivalents thereof.

What is claimed is:

1. A non-transitory computer-readable medium storing a program executable by a computer that, when executed by a processor of the computer, causes the computer to execute:
   first acquisition processing of acquiring a relative area information which indicates a relative position of a reference area relative to a reference document and a relative size of the reference area relative to a size of the reference document;
   second acquisition processing of acquiring target image data which is generated by using an image sensor and indicates a target image including a document;
   identification processing of identifying a target area in the target image by use of the target image data, the target area being in a position relative to the target image, which is indicated by the relative position of the relative area information, and the target area having a size relative to the size of the target image, which is indicated by the relative size of the relative area information;
   analysis processing of analyzing an area, in the target image, including the target area; and
   output processing of outputting output image data based on the target image data, the output processing being different depending on an analysis result of the target area.

2. The medium according to claim 1,
   wherein the identification processing includes:

identifying a position and a size of the target area in the target image in a first direction based on a size of the target image in the first direction and a relative position and a relative size of the reference area in the first direction relative to the reference document indicated by the relative area information; and identifying a position and a size of the target area in the target image in a second direction based on a size of the target image in the second direction and a relative position and a relative size of the reference area in the second direction relative to the reference document indicated by the relative area information, and the relative position and the relative size of the target area in the first direction are identified independently of the relative position and the relative size of the target area in the second direction.

3. The medium according to claim 1,
wherein the program causes the computer to further execute:
   detection processing of monitoring a specific-image-data storage area which stores image data generated by the image sensor and detecting storage of the image data in the specific-image-data storage area, and
   in the second acquisition processing, in a case that the storage of the image data in the specific-image-data storage area is detected, the image data in the specific-image-data storage area is acquired as the target image data.

4. The medium according to claim 1,
wherein the reference area and the target area are rectangle areas, and
the relative area information includes information which indicates a relative position of an angle of the reference area relative to a reference position of the reference document and information which indicates a relative size of a side of the reference area relative to a side of the reference document.

5. The medium according to claim 1, wherein the relative area information includes information which indicates coordinates of a specific position of one reference area relative to a reference position of the reference document by using a ratio of the size of the reference area to the size of the reference document.

6. The medium according to claim 1, wherein the relative area information includes information which indicate a ratio of the size of the reference area relative to the size of the reference document.

7. The medium according to claim 1,
wherein the reference area includes a first reference area and a second reference area,
the relative area information includes first relative area information which indicates a relative position and a relative size of the first reference area and second relative area information which indicates a relative position and a relative size of the second reference area,
the target area includes a first target area and a second target area,
the first acquisition processing includes acquiring the first relative area information and the second relative area information,
the identification processing includes identifying the first target area based on the first relative area information and identifying the second target area based on the second relative area information, the analysis processing includes analyzing an area which includes the first target area and the second target area, and the output processing depends on the analysis result of the first target area and the analysis result of the second target area.

8. The medium according to claim 1,
wherein the analysis processing includes analyzing whether a specific kind of image is present in the target area, and
the output processing includes first output processing executed in a case that the specific kind of image is present in the target area and second output processing executed in a case that the specific kind of image is not present in the target area.

9. The medium according to claim 1,
wherein the target image data is a target image file including pieces of page image data which indicate page images,
the output image data is one or more of output image files, based on the target image file, which include one piece or more pieces of page image data indicating one or more of page images,
the relative area information is common to the page images,
the identification processing includes identifying the target area based on the relative area information for each of the page images,
the analysis processing includes analyzing an area including the target area for each of the page images, and
the output processing depends on an analysis result of the target area for each of the page images.

10. The medium according to claim 9,
wherein the analysis processing includes analyzing whether a specific kind of image is present in the target area of each of the page images,
in a case that the specific kind of image is present in the target area of a specific page image of the page images, a first output image file and a second output image file are output in the output processing,
the first output image file includes first page image data,
the first page image data includes a specific piece of page image data, of the pieces of page image data, indicating the specific page image, and
the second output image file includes second page image data, of the pieces of page image data, which is different from the first page image data.

11. The medium according to claim 1,
wherein the program causes the computer to further execute display processing of displaying a user interface screen including the reference document on a display,
the first acquisition processing includes:
acquiring an instruction which designates a partial area of the reference document via the user interface screen, and
acquiring information which indicates a relative position and a relative size, of the partial area designated by the instruction, relative to the reference document, as the relative area information.

12. An image processing apparatus comprising a processor configured to execute:
   first acquisition processing of acquiring a relative area information which indicates a relative position of a reference area relative to a reference document and a relative size of the reference area relative to a size of the reference document;

second acquisition processing of acquiring target image data which is generated by using an image sensor and indicates a target image including a document;

identification processing of identifying a target area in the target image by use of the target image data, the target area being in a position relative to the target image, which is indicated by the relative position of the relative area information, and the target area having a size relative to the size of the target image, which is indicated by the relative size of the relative area information;

analysis processing of analyzing an area, in the target image, including the target area; and output processing of outputting output image data based on the target image data, the output processing being different depending on an analysis result of the target area.

13. The image processing apparatus according to claim 12,
wherein the identification processing includes:
identifying a position and a size of the target area in the target image in a first direction based on a size of the target image in the first direction and a relative position and a relative size of the reference area in the first direction relative to the reference document indicated by the relative area information; and
identifying a position and a size of the target area in the target image in a second direction based on a size of the target image in the second direction and a relative position and a relative size of the reference area in the second direction relative to the reference document indicated by the relative area information, and
the relative position and the relative size of the target area in the first direction are identified independently of the relative position and the relative size of the target area in the second direction.

14. The image processing apparatus according to claim 12,
wherein the processor is configured to further execute:
detection processing of monitoring a specific-image-data storage area which stores image data generated by the image sensor and detecting storage of the image data in the specific-image-data storage area, and
in the second acquisition processing, in a case that the storage of the image data in the specific-image-data storage area is detected, the image data in the specific-image-data storage area is acquired as the target image data.

15. The image processing apparatus according to claim 12,
wherein the target image data is a target image file including pieces of page image data which indicate page images,
the output image data is one or more of output image files, based on the target image file, which include one piece or more pieces of page image data indicating one or more of page images,
the relative area information is common to the page images,
the identification processing includes identifying the target area based on the relative area information for each of the page images,
the analysis processing includes analyzing an area including the target area for each of the page images, and
the output processing depends on an analysis result of the target area for each of the page images.

16. The image processing apparatus according to claim 15,
wherein the analysis processing includes analyzing whether a specific kind of image is present in the target area of each of the page images,
in a case that the specific kind of image is present in the target area of a specific page image of the page images, a first output image file and a second output image file are output in the output processing,
the first output image file includes first page image data,
the first page image data includes a specific piece of page image data, of the pieces of page image data, indicating the specific page image, and
the second output image file includes second page image data, of the pieces of page image data, which is different from the first page image data.

17. An image processing method comprising:
first acquisition processing of acquiring relative area information which at least indicates a relative position of a reference area relative to a reference document and a relative size of the reference area relative to a size of the reference document;
second acquisition processing of acquiring target image data which is generated by using an image sensor and indicates a target image including a document;
identification processing of identifying a target area in the target image by use of the target image data, the target area being in a position relative to the target image, which is indicated by the relative position of the relative area information, and the target area having a size relative to the size of the target image, which is indicated by the relative size of the relative area information;
analysis processing of analyzing an area, in the target image, including the target area; and
output processing of outputting output image data based on the target image data, the output processing being different depending on an analysis result of the target area.

18. The method according to claim 17,
wherein the identification processing includes:
identifying a position and a size of the target area in the target image in a first direction based on a size of the target image in the first direction and a relative position and a relative size of the reference area in the first direction relative to the reference document indicated by the relative area information; and
identifying a position and a size of the target area in the target image in a second direction based on a size of the target image in the second direction and a relative position and a relative size of the reference area in the second direction relative to the reference document indicated by the relative area information, and
the relative position and the relative size of the target area in the first direction are identified independently of the relative position and the relative size of the target area in the second direction.

19. The method according to claim 17, further comprising detection processing of monitoring a specific-image-data storage area which stores image data generated by the image sensor and detecting storage of the image data in the specific-image-data storage area,
wherein in the second acquisition processing, in a case that the storage of the image data in the specific-image-data storage area is detected, the image data in the specific-image-data storage area is acquired as the target image data.

20. The method according to claim 17,
wherein the target image data is a target image file including pieces of page image data which indicate page images,
the analysis processing includes analyzing whether a specific kind of image is present in the target area of each of the page images,
in a case that the specific kind of image is present in the target area of a specific page image of the page images, a first output image file and a second output image file are output in the output processing,
the first output image file includes first page image data,
the first page image data includes a specific piece of page image data, of the pieces of page image data, indicating the specific page image, and
the second output image file includes second page image data, of the pieces of page image data, which is different from the first page image data.

\* \* \* \* \*